Feb. 11, 1969  W. J. BAKER  3,426,797
MULTIPLE ORIFICE VALVE
Filed Oct. 20, 1965

INVENTOR.
WILLIAM J. BAKER
BY
Paul A. Weilein
ATTORNEY

United States Patent Office

3,426,797
Patented Feb. 11, 1969

3,426,797
MULTIPLE ORIFICE VALVE
William J. Baker, Garden Grove, Calif., assignor to Willis Oil Tool Co., Long Beach, Calif., a corporation of California
Filed Oct. 20, 1965, Ser. No. 498,755
U.S. Cl. 137—625.31                 6 Claims
Int. Cl. F16k 3/08, 3/30

ABSTRACT OF THE DISCLOSURE

A fluid flow control valve having an axially aligned inlet and outlet with relatively rotatable flow controlling disks in face engagement containing respectively a pair of similarly positioned diametrically opposed orifices, a cylindrical disk carrier fixedly mounting one of the disks having a central passage containing a separate sleeve liner connecting the disk orifices with the outlet, a rotatable cylindrical disk carrier mounting the other disk and having an actuator handle extending outwardly through an arcuate slot in the valve body, this carrier being sealed on opposite sides of the slot and the body being grooved between the seals and provided with a drain port, the rotatable carrier having a central passage connecting its disk orifices with the inlet and being connected through a port passage with an annular chamber extending about the interface of the disks.

---

The present invention relates to valves and particularly to a multiple orifice valve having therein orifice disks or members disposed in mutually contacting relation and having a number of angularly spaced orifices or openings therethrough which, upon relative angular movement between the disks, are progressively moved between a first position at which said openings are completely out of alignment and, therefore, the valve is closed, and a second position in which the openings in the disks are fully aligned, the intermediate positions throughout the range of movement varying progressively the flow area through the disk openings so that the ultimate flow through the valve assembly may be controlled to a fine degree.

More particularly, the invention involves the provision of a multiple orifice valve assembly, an object of which is to enable its installation in a flow line in such a manner that changes in the direction of flow through the valve are not necessitated, i.e., the valve is adapted to be installed in an in-line conduit as distinguished from being installed at an angular junction in the conduit.

Another object of the invention is to provide a multiple orifice valve of the above described type which is of simple construction, is simple to service and maintain, and which has operating means for effecting rotation of one disk relative to the other within limits defined by the range of movement of which the actuating means is capable so that the disk may be moved between a first position at which one or more orifices in said disk are closed by imperforate portions of a contiguous disk and a second position at which the orifices or openings in the disks are in alignment, the assembly being provided with means indicative of any intermediate positioning of the actuator means which is also indicative of selected intermediate positions of the orifice disks whereby a fine degree of control of the rate of flow through the valve assembly may be accomplished.

Other objects and advantages of the invention will be hereinafter described or will become apparent to those skilled in the art, and the novel features of the invention will be defined in the appended claims.

Figure 1:
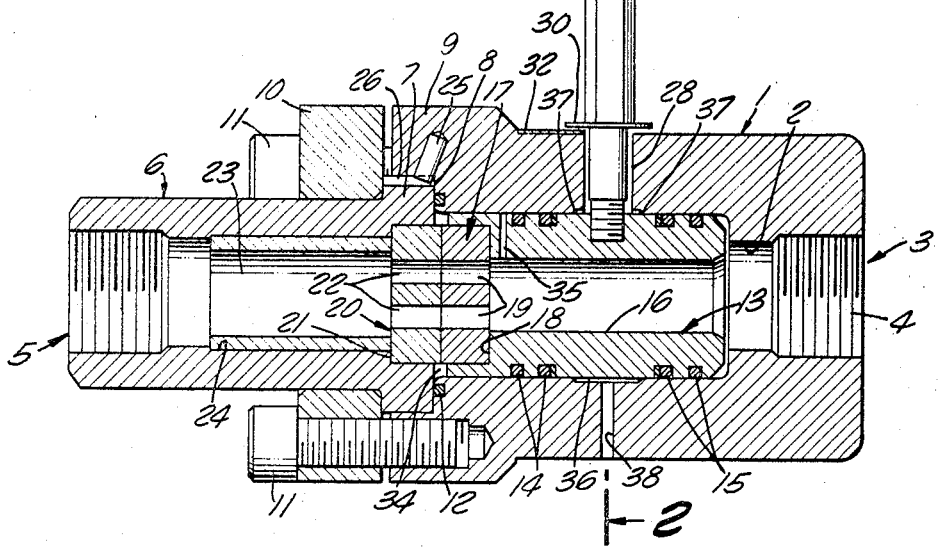
Figure 2:
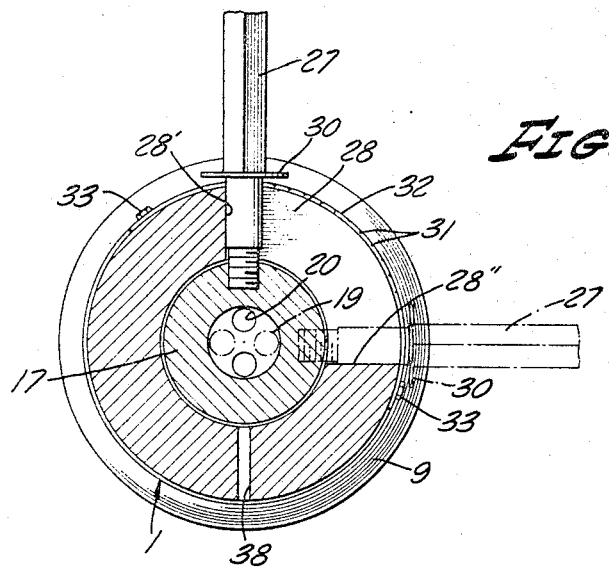

In the accompanying drawings:

FIG. 1 is a longitudinal sectional view through a valve assembly in accordance with the invention, the orifice disks being shown in relative positions such that the orifices therethrough are in full alignment; and FIG. 2 is a view in transverse section as taken on the line 2—2 of FIG. 1 and showing in broken lines the valve operating means and rotatable valve disk disposed in a position in which the orifices are fully occluded.

Like reference characters to the several views of the drawing and in the following description designate corresponding parts.

The illustrative embodiment of a valve made in accordance with the invention comprises a body or housing 1 having therein a cylindrical bore 2 into which leads an inlet opening 3. Adjacent the inlet opening the body is provided with means such as an internal thread 4 adapted to establish a connection between the body 1 and a fluid conduit, not shown. At the opposite end of the housing 1 from the inlet 3 is an outlet opening 5 which, as here shown, is provided in an outlet fitting 6 of tubular construction which constitutes, as will be hereinafter more fully pointed out, a stationary disk carrier. The fitting 6 has an inner flange 7 adapted to abut with an internal shoulder 8 in the body 1 formed within an annular flange 9. A cooperative attachment flange 10 is adapted to be secured to flange 9 by suitable fasteners 11 and to abut with the connector flange 7 to urge the same into engagement with shoulder 8. It will also be noted that a suitable sealing means illustratively in the form of an O-ring 12 is interposed between abutting flanges 7 and 8. The structure thus far described will be seen to provide an in-line passage extended through the body 1 and through the fitting 6 from the inlet 3 to the outlet 5.

Disposed in the just mentioned passage and more particularly within the cylindrical bore 2 is a tubular member 13 which, as will hereinafter be more fully described, constitutes a disk carrier. This disk carrier 13 is revolvably mounted in the bore 2 and suitable sealing means illustratively in the form of O-rings 14 and 15 are interposed between the carrier 13 and the body 1 in axially spaced relation so as to isolate the midsection of the disk carrier 13 from exposure to the fluid in the body 1 for a reason which will hereinafter more fully appear. Disk carrier 13 has a central passage 16 therethrough whereby fluid may flow therethrough.

Carried by disk carrier 13 is a disk 17 which may be formed of suitable erosion resistant material such as certain vitreous materials or erosion resistant metal, the disk carrier 13 having a seat 18 in which the disk 17 is affixed as by a tight press fit or otherwise, as may be desired, so as to span the central passage 16 through the carrier. Through the disk 17 extend a suitable number of angularly spaced orifices or openings 19, in the illustrative embodiment there being a pair of such orifices spaced 180° apart and at opposite sides of the axis of the disk.

The disk 17 constitutes a rotatable disk as will hereinafter appear, and cooperates with a stationary disk 20 which is suitably affixed as by means of a press fit or the like in a seat 21 provided in the disk carrier 6 so as to span the outlet opening 5 and be disposed in abutting radial face-to-face relationship with the disk 17 upon assembly of the device. Through the disk 20 extend a plurality of orifices or openings 22 which, like the orifices 19 in the illustrative embodiment, are shown as being a pair of diametrically oppositely disposed orifices spaced at opposite sides of the axis of the disk 20 so as to be alignable with the orifices 19 in disk 17 in one relative angular position of the disks.

The disk carrier 6 may be composed of any suitable material but preferably is provided internally with a liner sleeve 23 seating in a counterbore 24. The liner sleeve 23 provides a replaceable surface with which will inpinge fluid passing through orifices 22 in disk 20. Therefore, it is preferred that the liner 23 be composed of suitable erosion resistant material.

It is desired that the disks 17 and 20 be disposed in the housing in a known relative angular relationship. Therefore, means are provided for orienting disk carrier 6 in a known relationship to the body 1. Such means is shown as including a pin 25 carried by the body and engageable in a marginal notch 26 in the flange 7 of the disk carrier 6.

This means for effecting angular movement of the disk 17, as will now be described, also includes means for indicating the relative angular position of the disk 17 within the body 1 whereby the disk 17 may be moved from the position shown in FIG. 1 and in full lines in FIG. 2 to the position shown in broken lines in FIG. 2 and, in addition, the disk 17 may be located at any selected intermediate position between the full open position shown in FIGS. 1 and 2 and the broken line fully closed position shown in FIG. 2.

In order to effect such angular movement of the disk 17, the disk carrier 13 is provided with operating means in the form of a lever or handle 27 projecting radially therefrom through an angularly extended radial slot 28 in the body 1, the handle 27 being provided with a hand knob 29. The slot 28 will be seen in FIG. 2 to have an end wall 28' engageable by the handle 27 to limit movement of the latter to a first position at which the valve orifices 19 and 22 are in full alignment or in full open relation, whereas at the other end of the slot 28 is an end wall 28" which constitutes a stop to limit movement of the handle 27 to a second position at which the orifices of disk 17 are occluded or completely closed by the disk 20.

In order that the angular relationship between the disks 17 and 20 will be known at all positions of the handle 27 intermediate the limits just described, the handle 27 is provided with an appropriate indicator element 30 adapted to cooperate with graduations 31 provided in spaced relation about the periphery of the body 1 adjacent the slot 28, such graduations, for example, being provided in or on a band 32 suitably affixed about the body 1 as by fasteners 33.

Within the body 1 adjacent the flange 7 of disk carrier 6 there is formed by the structure previously described an annular chamber 34 which extends about the disks 17 and 20 in the region of their interface. Inasmuch as the pressure of fluid which may find access to this chamber is a function of pressure in the housing and the effecting sealing coengagement between the contacting radial faces of the disks 17 and 20, it is desired that a predetermined pressure exist in the chamber 34. This is accomplished by the provision of a port 35 leading from the passage 16 through disk carrier 13 into the cylindrical bore 2 downstream of the seals 14. Thus, it will be apparent that the pressure in chamber 34 acting axially on the disk carrier 13 will be essentially the same pressure acting axially on the disk carrier 13 in the opposite direction at the right hand end of the disk carrier 13 as viewed in FIG. 1. Accordingly, it will be noted that under all conditions of pressure variation the disk carrier 13 and the disk 17 will be pressure loaded toward the nonangularly movable disk 20.

In order to facilitate assembly of the structure thus far described without damage to the O-ring seals 15 as they are moved axially past the slot 28, it is preferred that the inner cylindrical wall forming the bore 2 be provided with an annular groove 36 having bevelled side walls 37 which will evenly radially inwardly compress the O-rings as they are moved longitudinally through the bore 2. In addition, the groove 36 provides a drain channel whereby when the valve assembly is installed in a line with the slot 28 and handle 27 disposed at the top of the assembly, any water or other liquid which may find access through the slot 28 will flow to the base of the assembly and from there be drained through a port 38.

In operation it will now be understood that when the valve is fully open as shown in full lines in the drawing and should it be desired that the valve be adjusted so as to restrict flow through the same, clockwise angular movemnt of the handle 27 from the full line position shown in FIG. 2 toward the broken line position will effect progressive angular movement of the angularly movable disk 17 so that the orifices 19 in the latter will progressively be moved out of alignment with the orifices 22 in the stationary disk 20. The graduations 31 will preferably be indicative of increments of movement and of resultant effective orifice size. This is to say, by way of example, that if the orifice size be initially ¼ inch diameter, then at a midpoint of adjustment the resultant flow area through the partially misaligned orifices may be 50% of the full open flow area.

Inasmuch as the valve may be installed in a flow line leading from a well and the well fluids may be highly erosive, an advantage of the structure is that it may be disposed in the flow line without requiring changes in the direction of fluid flow and erosive action will thereby be minimized.

While the specific details of an illustrative multiple orifice valve assembly have been herein shown and described, changes and alterations may be resorted to without departing from the spirit of the invention as defined in the appended claims.

I claim:

1. A flow control valve, comprising: an axially extended body having a cylindrical bore therein; an inlet opening leading axially into said bore; a cylindrical rotatable disk carrier revolvably disposed in said bore and having axially spaced sealing means between said body and said rotatable disk carrier; said rotatable disk carrier having a central flow passage therethrough; a disk carried by said rotatable disk carrier spanning said passage and having a pair of openings therein spaced from the axis of said disk; said body having an angularly extended slot opening radially from said bore between said sealing means; an operating handle extended through said slot and connected to said rotatable disk carrier; a stationary disk carrier having an outlet opening axially aligned with said inlet opening and said passage through said rotatable disk carrier; a disk carried by said stationary disk carrier spanning said outlet opening; said disks having orifices therethrough alignable and closable upon rotation of said rotatable disk carrier in opposite directions; means connecting said stationary disk carrier to said body with the last mentioned disk in radial face-to-face contact with the first mentioned disk; means forming a chamber at the outer margin of said disks; and port means in said rotatable disk carrier for permitting the application of fluid pressure from said flow passage through said rotatable disk carrier to said chamber.

2. A flow control valve, comprising: an axially extended body having a cylindrical bore therein; an inlet opening leading axially into said bore; a cylindrical rotatable disk carrier revolvably disposed in said bore and having axially spaced sealing means between said body and said rotatable disk carrier; said rotatable disk carrier having a central flow passage therethrough; a disk carried by said rotatable disk carrier spanning said passage and having a pair of openings therein spaced from the axis of said disk; said body having an angularly extended slot opening radially from said bore between said sealing means; an operating handle extended through said slot and connected to said rotatable disk carrier; a stationary disk carrier having an outlet opening axially aligned with said inlet opening and said passage through said rotatable disk carrier; a disk carrier by said stationary disk carrier spanning said outlet opening; said disks having orifices therethrough alignable and closable upon rotation of said rotatable disk carrier in opposite directions; means connecting said stationary disk carrier to said body with the last mentioned disk in radial face-to-face contact with the first mentioned disk; and cooperative means on said handle and said body indicative of the relative position of said disks.

3. A fluid flow control valve, comprising: a body having axially aligned inlet and outlet openings and a flow passage therethrough; flow control means in said body comprising a pair of disks disposed in adjacent relationship spanning said passage and respectively having at least an orifice disposed in spaced relation to the axis of said disks; means maintaining one of said disks fixed in said body and means for rotating the other of said disks; the means for rotating the other of said disks including a disk carrier rotatably disposed in said body; an angularly extending slot in said body; sealing means disposed in axially spaced relation at opposite sides of said slot; said body forming an annular space about said disks; a port in said disk carrier leading from said passage to said space for conducting fluid under pressure thereto from said flow passage; and actuator means connected to said disk carrier and extending outwardly through said slot.

4. A fluid flow control valve, comprising: a body having axially aligned inlet and outlet openings and a flow passage therethrough; flow control means in said body comprising a pair of disks disposed in adjacent relationship spanning said passage and respectively having at least an orifice disposed in spaced relation to the axis of said disks; means maintaining one of said disks fixed in said body and means for rotating the other of said disks; the means for rotating the other of said disks including a disk carrier rotatably disposed in said body; an angularly extended slot in said body; sealing means disposed in axially spaced relation at opposite sides of said slot; means providing a groove in the plane of said slot and between said sealing means for passage of foreign fluids entering said slot; a drain leading through said body from said groove; and actuator means connected to said disk carrier and extended outwardly through said slot.

5. A fluid flow control valve, comprising: a body having axially aligned inlet and outlet openings; flow control means in said body between said inlet and outlet openings comprising a pair of axially aligned disks disposed in face engagement relationship and respectively having at least an orifice disposed in spaced relation to the axis of said disks; means maintaining one of said disks fixed in said body and providing a flow passage connecting its orifice with said outlet; means for rotating the other of said disks including a cylindrical disk carrier rotatably disposed in said body and having a portion extending axially from said other disk with a central flow passage therethrough connecting its orifice with said inlet; an angularly extended slot in said body positioned radially outwardly of said extending portion; means sealing said extending portion against fluid flow to said slot from within said body; and actuator means connected to said extending portion of the rotatable disk carrier and extending outwardly through said slot for moving said carrier to flow and non-flow positions with respect to the orifices of said disks.

6. A fluid flow control valve according to claim 5, including a separate tubular sleeve liner in the flow passage of the disk carrier mounting said one of said disks.

References Cited

UNITED STATES PATENTS

| 2,037,663 | 4/1936 | Lalor | 137—556.6 X |
| 2,688,340 | 9/1954 | Stehlin | 251—340 X |
| 2,889,852 | 6/1959 | Dunlap | 251—206 X |
| 2,959,330 | 11/1960 | Charbonneau | 137—625.46 X |
| 3,005,468 | 10/1061 | Erwin et al. | 137—625.31 |
| 3,026,899 | 3/1962 | Mischanski | 137—625.31 X |
| 3,207,181 | 9/1965 | Willis | 251—208 X |

FOREIGN PATENTS 448,228  5/1949  Italy.

M. CARY NELSON, *Primary Examiner.*

ROBERT C. MILLER, *Assistant Examiner.*

U.S. Cl. X.R.

251—340